(12) United States Patent
Lan

(10) Patent No.: US 10,151,953 B2
(45) Date of Patent: Dec. 11, 2018

(54) IN-PLANE SWITCHING DISPLAY HAVING PROTRUSION ELECTRODES WITH METAL ENHANCED ADHESION

(71) Applicant: A. U. Vista, Inc., Milpitas, CA (US)

(72) Inventor: Yi-Fen Lan, Hsin-Chu (TW)

(73) Assignee: A. U. Vista, Inc., Milpitas, CA (US)

( * ) Notice: Subject to any disclaimer, the term of this patent is extended or adjusted under 35 U.S.C. 154(b) by 95 days.

(21) Appl. No.: 15/439,129

(22) Filed: Feb. 22, 2017

(65) Prior Publication Data

US 2018/0239203 A1    Aug. 23, 2018

(51) Int. Cl.
*G02F 1/1337*     (2006.01)
*G02F 1/1343*     (2006.01)

(52) U.S. Cl.
CPC .... *G02F 1/134363* (2013.01); *G02F 1/13439* (2013.01); *G02F 1/133707* (2013.01); *G02F 2201/124* (2013.01); *G02F 2202/28* (2013.01)

(58) Field of Classification Search
CPC .......... G02F 1/133707; G02F 2202/28; G02F 1/13439; G02F 1/134363; G02F 2201/124
See application file for complete search history.

(56) References Cited

U.S. PATENT DOCUMENTS

| | | | |
|---|---|---|---|
| 6,583,840 B1 * | 6/2003 | Inoue | G02F 1/134363 349/141 |
| 6,642,071 B2 | 11/2003 | Cheng | |
| 6,689,629 B2 | 2/2004 | Tsujimura et al. | |
| 7,652,285 B2 | 1/2010 | Chen | |

(Continued)

FOREIGN PATENT DOCUMENTS

| | | |
|---|---|---|
| CN | 105446044 | 3/2016 |
| TW | I518424 | 1/2016 |

OTHER PUBLICATIONS

Yoon, S. et al., "Study on the light leakage mechanism of a blue phase liquid crystal cell with oblique interfaces," Journal of Physics D: Applied Physics, vol. 45, 105304, Feb. 24, 2012, 6 pages.

(Continued)

*Primary Examiner* — Jia Pan
(74) *Attorney, Agent, or Firm* — Ware, Fressola, Maguire & Barber LLP

(57) ABSTRACT

An in-plane switching liquid crystal display has a plurality of protrusion electrodes. Each of the protrusion electrodes has a protrusion body with a surface coated with an electrically conductive layer made from a metal oxide. An adhesion-enhancement medium is provided between the electrically conductive layer and the surface of the protrusion body. The adhesion-enhancement medium comprises a metal such as aluminum or molybdenum or a metal alloy containing molybdenum and at least one of niobium, tantalum, titanium, zirconium, tungsten, aluminum and nitride or a metal alloy containing aluminum and at least one of niobium, tantalum, titanium, zirconium, tungsten, molybdenun and nitride. The protrusion body can have the shape of a rectangle, triangle, bell, rectangle with a round top, or a cross sectional area having a top portion with a round or flat head and a bottom portion with a waist portion, smaller than the basewidth.

16 Claims, 6 Drawing Sheets

(56) References Cited

U.S. PATENT DOCUMENTS

| | | | |
|---|---|---|---|
| 2005/0179847 A1* | 8/2005 | Miyachi | C09K 19/02 349/141 |
| 2010/0091228 A1* | 4/2010 | Kim | G02F 1/133707 349/122 |
| 2011/0096255 A1* | 4/2011 | Rho | C09K 19/0275 349/33 |
| 2011/0128491 A1* | 6/2011 | Kubota | G02F 1/133707 349/139 |
| 2012/0212693 A1* | 8/2012 | Kubota | G02F 1/133707 349/96 |
| 2013/0128207 A1* | 5/2013 | Nakano | G02F 1/1343 349/141 |
| 2015/0346568 A1 | 12/2015 | Kubota et al. | |
| 2017/0131597 A1* | 5/2017 | Tsao | G02F 1/134309 |
| 2017/0255035 A1* | 9/2017 | Lan | G02F 1/13306 |

OTHER PUBLICATIONS

Taiwan Office Action, Taiwan Patent Application No. 107103518, dated Oct. 15, 2018, 6 pages.

\* cited by examiner

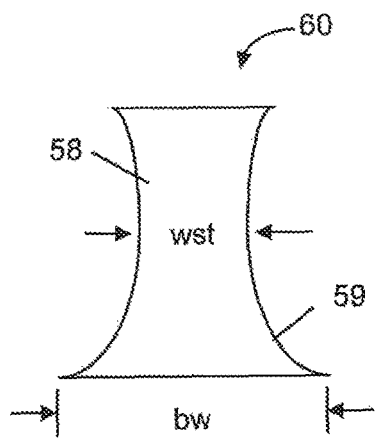
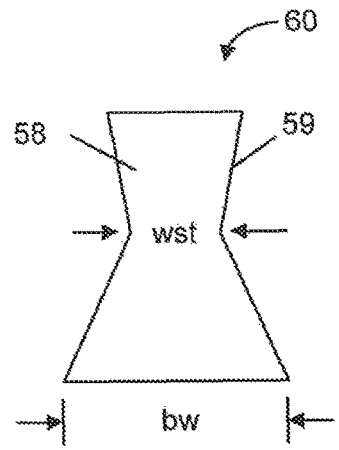
FIG. 5A
FIG. 5B
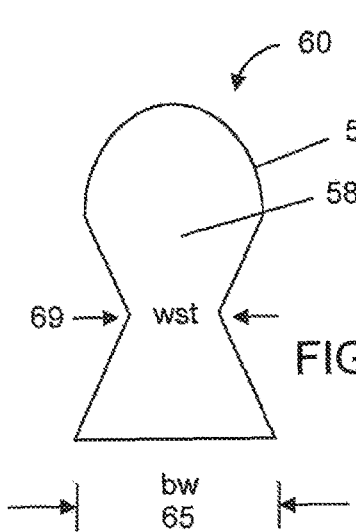
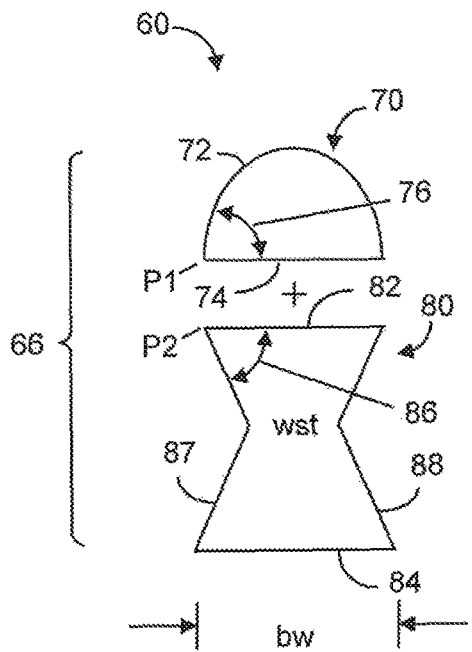
FIG. 5
FIG. 6

IN-PLANE SWITCHING DISPLAY HAVING PROTRUSION ELECTRODES WITH METAL ENHANCED ADHESION

TECHNICAL FIELD

The present invention relates generally to a liquid-crystal display (LCD) and, more particularly, to an in-plane switching LCD.

BACKGROUND TECHNOLOGY

In-plane switching (IPS) is a display technology that has been used in a liquid crystal display (LCD) panel wherein twisted nematic (TN) or chiral nematic liquid crystals are used as a light-controlling medium. In particular, in a display panel where a nematic liquid crystal material known as the blue-phase light crystal (BPLC) is used to control the transmission of light, the structure of the electrodes plays an important role in controlling the driving voltage of the liquid crystal display and the contrast of the display.

In an IPS LCD panel using a nematic liquid crystal as the light controlling medium, the electric field that controls the alignment or configuration of the liquid crystal molecules is provided by two sets of protrusion electrodes alternately arranged on the lower substrate of the display. Typically, the display panel has two substrates and two polarizers with different polarization directions disposed on each of the substrates. The configuration of the liquid crystal molecules, along with the polarization directions of the two polarizers, controls the optical transmissivity of the display.

The performance of BPLC is largely determined by the BPLC materials. As known in the art, BPLC materials have three types: BP-I, BP-II and BP-III. It has been reported that BP-II exhibited a smaller hysteresis than BP-I and BP-II has a faster response time than BP-I. BP-III has greatly improved the response time in micro-second scale. These three BP types can be differentiated with the assembled structure of the double-twist cylinders (DTCs). The DTC assembly of the BP-I is body-centered cubic, BP-II is simple cubic and BP-III has an arbitrary orientation (amorphous). The sub-millisecond response time is a major advantage of BPLC. However, in order to stabilize BPLC, polymeric stabilization should be applied. Polymeric stabilization has revealed a major drawback of BPLC as it requires a large driving voltage of >100V in an IPS cell. To reduce the driving voltage, protrusion electrodes are used in the IPS cell to achieve a low driving voltage of 35V. However, it has been found that the coating on the protrusion electrodes is subject to peeling which results in a very low yield of the protrusion IPS.

To name a few, the following references are related background techniques to some extent.

Additional techniques for forming TFTs are disclosed in Chen, U.S. Pat. No. 7,652,285, which is assigned to AU Optronics Corp., the parent company of the assignee of the current application, and hereby incorporated by reference in its entirety. As disclosed in Chen, to form the channel of the TFT, the second metal layer is etched in order to open a portion of the second metal layer over the gate electrode and to separate the source region and drain region. This etching can be performed in multiple ways, including the back-channel etching process disclosed for example in Chen FIGS. 2A-2E and the etch stop process disclosed for example in Chen FIGS. 5A-5D and 6.

Chen discloses that TFT leakage currents may be reduced by adding a spacer layer formed at the sidewalls of the conductive doped amorphous silicon layer, isolating the conductive amorphous silicon layer from the insulating layer. Chen discloses that this spacer layer can be formed by oxidizing the exposed surface of the conductive amorphous silicon layer after the etching of the second metal layer is performed. Chen discloses that this surface may be oxidized by a number of different techniques, including oxygen plasma ashing and the use of ozone plasma in the presence of carbon tetrafluoride and sulfur hexafluoride gases.

As disclosed in Tsujimura et al., U.S. Pat. No. 6,689,629, which is assigned to AU Optronics Corp., the parent company of the assignee of the current application, and hereby incorporated by reference in its entirety, the wirings, such as the scan lines and signal lines of the array, are preferably comprised of a low-resistance material, such as aluminum or an aluminum alloy, so as to increase the speed with which the scan lines and signal lines operate. However, aluminum tends to be easily oxidized. For that reason, Tsujimura et al. discloses forming wirings as a two-layer structure, with a lower layer of aluminum, aluminum alloy or other low-resistance material, and an upper layer of molybdenum, chromium, tantalum, titanium, alloys thereof, or oxidation-resistant conductive materials.

Tsujimura et al. further discloses that the scan lines and signal lines contact connection pads, through which the array is connected to a driving system. Tsujimura et al. discloses forming dummy conductive patterns, situated between the connection pads and the pixel electrodes, but not in contact with any of the wirings on the substrate. By increasing the density of conductive material in a given area, the dummy conductive patterns can reduce etching undercut and improve the tapered shape of the wiring.

SUMMARY OF THE DISCLOSURE

The present invention is related to patent application Ser. No. 15/334,460, filed Dec. 19, 2016, which is assigned to the assignee of the present invention and is hereby incorporated by reference in its entirety. The present invention relates to an in-plane switching LCD panel wherein a plurality of protrusion electrodes is used to control the optical isotropicity of the liquid crystal layer. Each of the protrusion comprises a protrusion body and an electrode layer disposed thereon. The adhesion of the electrode layer to the protrusion body can be enhanced by an adhesion-enhancement medium.

Thus, the first aspect of the present invention is a liquid crystal display comprising:

a first substrate;

a second substrate;

a liquid crystal layer disposed between the first substrate and the second substrate, a plurality of first protrusion electrodes and a plurality of second protrusion electrodes alternately arranged on the second substrate such that each of the plurality of first protrusion electrodes is adjacent to but spaced from at least one of the plurality of second protrusion electrodes, wherein each of the plurality of first protrusion electrodes and the plurality of second protrusion electrodes comprises a protrusion body with a surface, and an electrode coating disposed on the surface of the protrusion body, wherein the electrode coating comprises an outer electrode layer and an adhesion-enhancement medium disposed between the outer electrode layer and the surface, and a voltage source electrically coupled to the plurality of first protrusion electrodes and the plurality of second protrusion electrodes, the voltage source arranged to provide a voltage potential between a first protrusion electrode and an adjacent second protrusion electrode, such that the liquid crystal layer is configured in a first optical state when the voltage potential is provided between the first protrusion electrodes and the second protrusion electrodes, and the liquid crystal molecules are configured in a second optical second state, when the first protrusion electrodes are electrically coupled to the second protrusion electrodes.

According to an embodiment of the present invention, the outer electrode layer comprises a metal oxide layer, wherein the metal oxide layer is made of a material selected from the group consisting of ITO, IZO, IGO, InO, ZTO, ZnO, ZnON and AlZTO.

According to an embodiment of the present invention, the adhesion-enhancement medium comprises a metal or a metal alloy, wherein the metal comprises aluminum or molybdenum and the metal alloy consists of molybdenum and at least one of materials selected from the group consisting of niobium, tantalum, titanium, zirconium, tungsten, aluminum and nitride.

According to an embodiment of the present invention, the metal alloy consists of aluminum and at least one of materials selected from the group consisting of niobium, tantalum, titanium, zirconium, tungsten, molybdenum and nitride.

According to an embodiment of the present invention, the adhesion-enhancement medium has a thickness ranged from 1 nm to 50 nm.

According to an embodiment of the present invention, the weight percentage of the adhesion-enhancement medium in the electrode coating has a range of 0.001 to 30.

According to an embodiment of the present invention, the outer electrode layer has a thickness ranged from 1 nm to 200 nm.

According to an embodiment of the present invention, the protrusion body has a cross-sectional area comprising first portion adjacent to the second substrate, a second portion opposing the first portion, and a body section bound by the first portion, the second portion, a first side and a second side, the first portion having a basewidth, wherein the first side and the second side are separated by a varied distance, the varied distance having a shortest distance defining a waist of the body section, the waist smaller than the basewidth.

The second aspect of the present invention is a method of improving quality of a protrusion electrode in display panel, the protrusion electrode comprising a protrusion body and an electrode layer disposed on the protrusion body, the method comprising:

providing an adhesion-enhancement medium between the electrode layer and the protrusion body, wherein the electrode layer is made from an electrically conducting material and the adhesion-enhancement medium comprises a material different from said electrically conducting material.

According to an embodiment of the present invention, the display comprises a liquid crystal display.

According to an embodiment of the present invention, the display comprises an in-plane switching display.

The present invention will become apparent upon reading the description in conjunction with FIGS. 1A to 6.

BRIEF DESCRIPTION OF THE DRAWINGS

FIG. 5 shows the shape characteristics of the protrusion body of FIG. 4.

FIGS. 5A and 5B shows the shape characteristics of the protrusion body of FIGS. 3H and 3J FIG. 6 illustrates two adjoining parts of the protrusion body of FIG. 4, according to an embodiment of the present invention.

DETAILED DESCRIPTION OF THE INVENTION

In general, the making of the protrusion electrodes is a major factor in determining the display quality of an in-plane switching (IPS) liquid crystal display (LCD). This may include the structure, constitution and makeup of the protrusion electrodes. It has been found that the quality of the electrode coating and the shape of the protrusion electrodes may affect the transmittance efficiency, the contrast and the sharpness of the display. Typically a protrusion electrode has a protrusion body coated with an electrically conductive layer. One of the defects found in an IPS display is detachment, partially or otherwise, of the electrically conductive coating from the protrusion body. The detachment is herein referred to as "peeling". Such defect may affect the transmittance of the display and may result in a very low yield of the protrusion IPS display. It has also been found that the shape of the protrusion electrodes not only affects the transmittance efficiency versus the potential difference between two adjacent electrodes when the pixel is in the "bright" state, but also affects the opacity of the pixel is in the "dark" state. The transparency of the liquid crystal display in the bright state and the opacity of the liquid crystal display in the dark state define the contrast of the LCD.

Figure 1A:
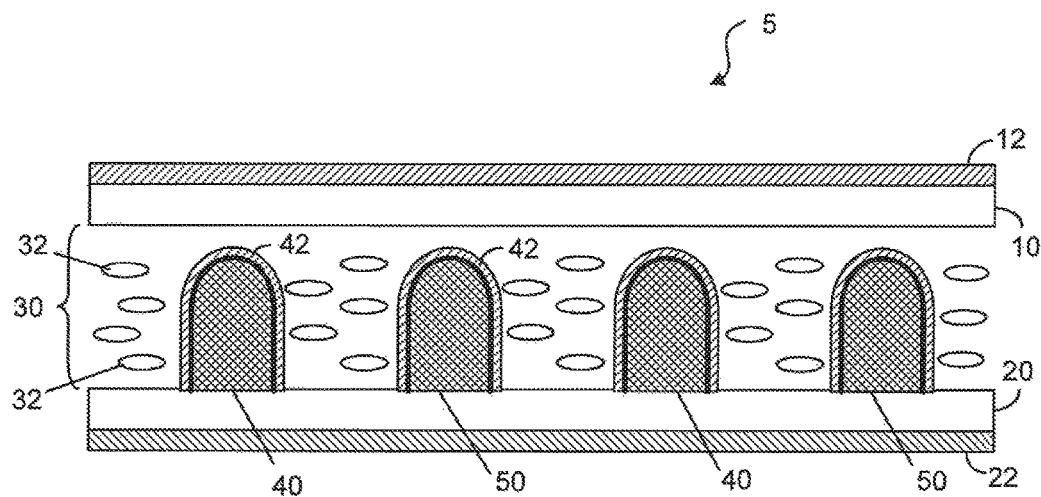
FIG. 1A illustrates a cross-sectional view of the liquid crystal display, according to an embodiment of the present invention.
Figure 1B:
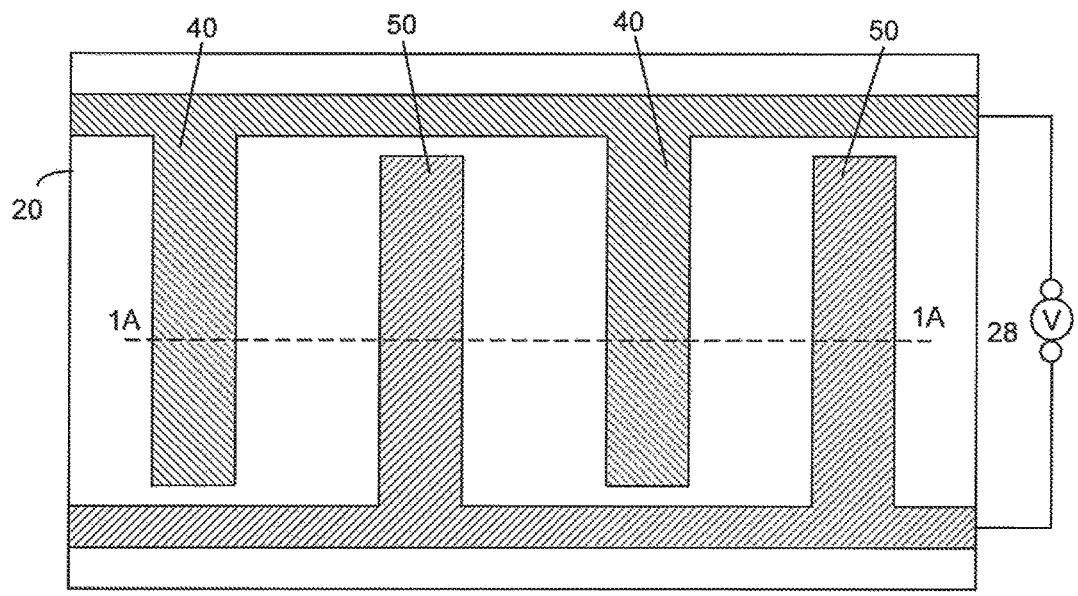
FIG. 1B illustrates a top view of the lower substrate of the liquid crystal display having a plurality of first protrusion electrodes and a plurality of second protrusion electrodes disposed thereon.

As seen in FIG. 1A-1B, which illustrate an embodiment of the present invention, the liquid crystal display 5 has a first substrate 10, a second substrate 20 and a liquid crystal layer 30 disposed between the first substrate and the second substrate. The display 5 also has a first polarizer 12 disposed adjacent to the first substrate 10 and a second polarizer 22 disposed adjacent to the second substrate 20, a plurality of first protrusion electrodes 40 and a plurality of second protrusion electrodes 50 alternately arranged on the second substrate 20 such that each of the first protrusion electrodes is adjacent to but spaced from at least one of the second protrusion electrodes. Each of the first protrusion electrodes 40 and the second protrusion electrodes 50 has an electrode coating 42. A voltage source 28 electrically coupled to the coating 42 of the first protrusion electrodes 40 and the coating 42 of the second protrusion electrode is used to provide a voltage potential or electric field between a first protrusion electrode 40 and an adjacent second protrusion electrode 50.

Figure 2A:
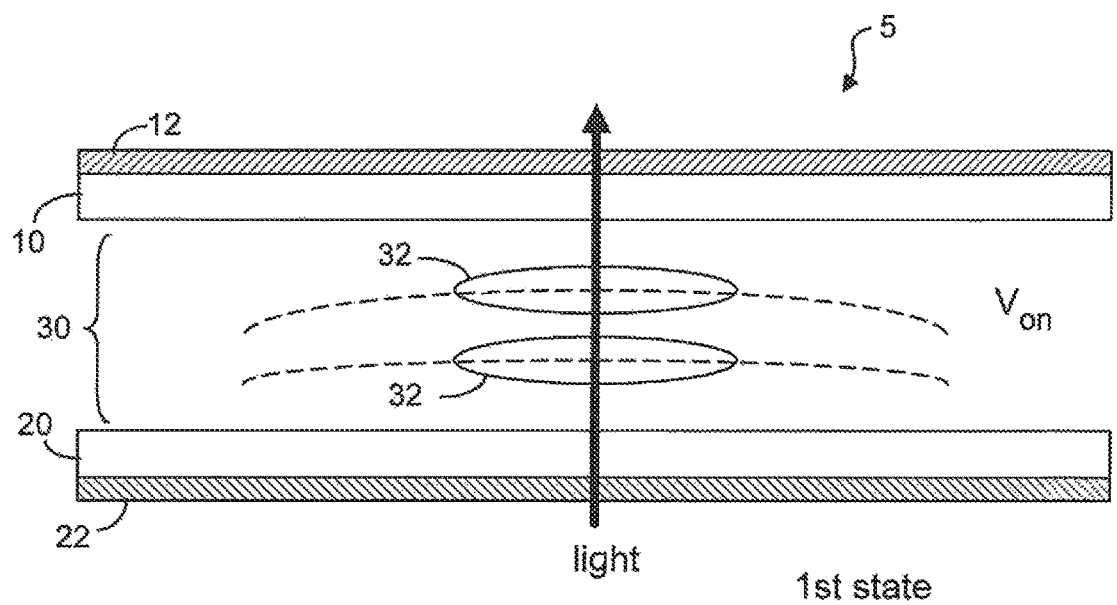
FIG. 2A is graphical representation of the liquid crystal display when the liquid crystal molecules are configured in a first state, according to an embodiment of the present invention.
Figure 2B:
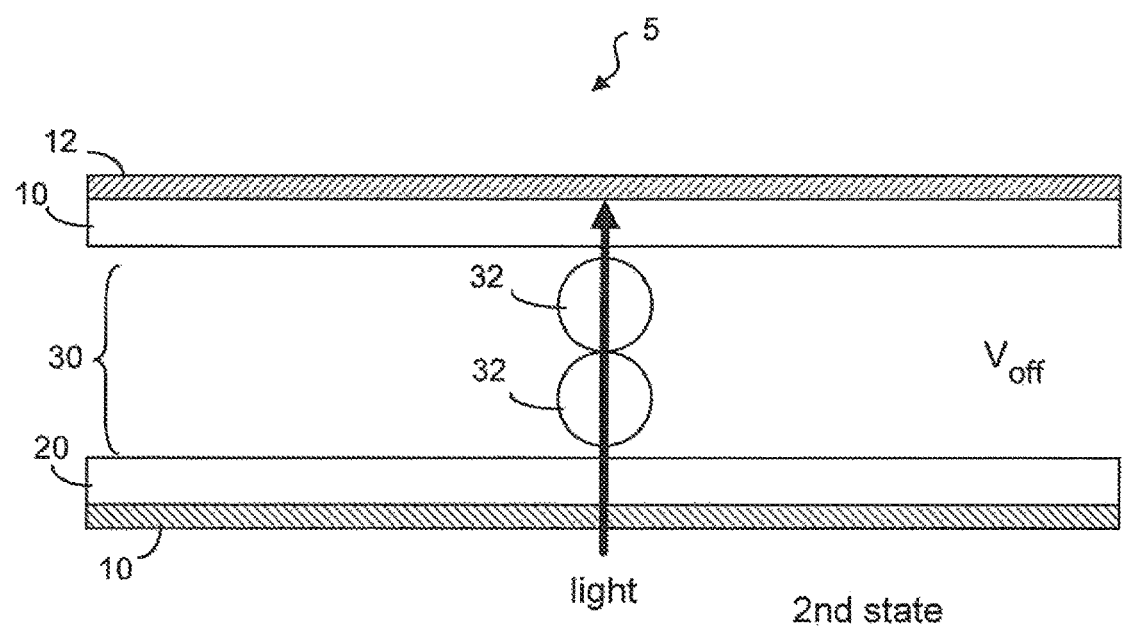
FIG. 2B is graphical representation of the liquid crystal display when the liquid crystal molecules are configured in a second state, according to an embodiment of the present invention.

It is understood that the first polarizer 12 has a first polarization direction and the second polarizer 22 has a different second polarization direction. The liquid crystal layer 30 comprises a plurality of liquid crystal molecules 32 configured or aligned in response to a voltage potential as illustrated in FIGS. 2A-2B. The optical isotropicity of the liquid crystal layer 30 is defined by the first state and the second state in which the liquid crystal molecules 32 are aligned. The optical isotropicity of the liquid crystal layer 30, along with the first and second polarization directions, determines the optical transmissivity of the liquid crystal display. According to an embodiment of the present invention, the liquid crystal molecules 32 are configured in the first state when the voltage potential is provided between the first protrusion electrodes 40 and the second protrusion electrodes 50, and the liquid crystal molecules 32 are configured in the second state, when the first protrusion electrodes 40 are electrically coupled to the second protrusion electrodes 50.

Figure 3:
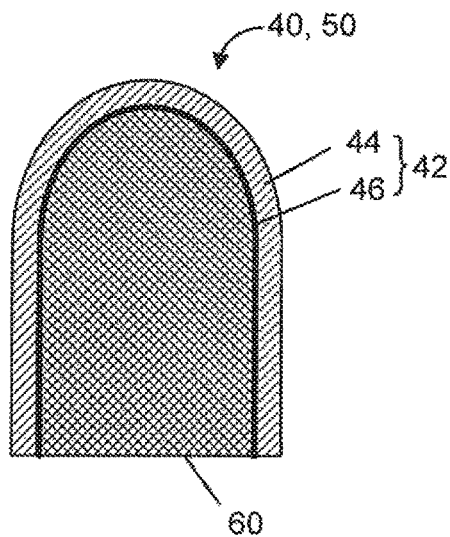
FIG. 3 is a cross-sectional view of a protrusion electrode having an electrode coating on a protrusion body, according an embodiment of the present invention.
Figure 3A:
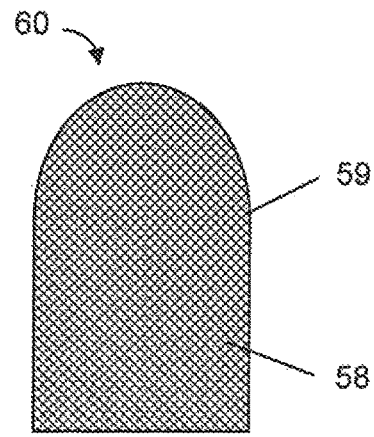
FIG. 3A illustrates the protrusion body of a protrusion electrode, according to an embodiment of the present invention.
Figure 3B:
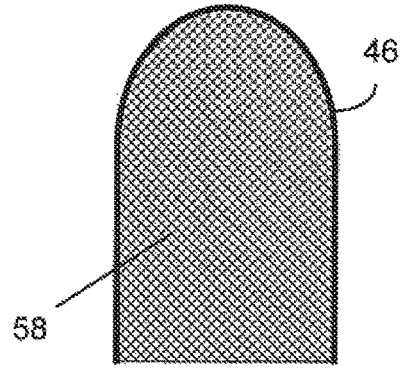
FIG. 3B illustrates the protrusion body having a surface with an adhesion-enhancement medium disposed therein, according to an embodiment of the present invention.
Figure 3C:
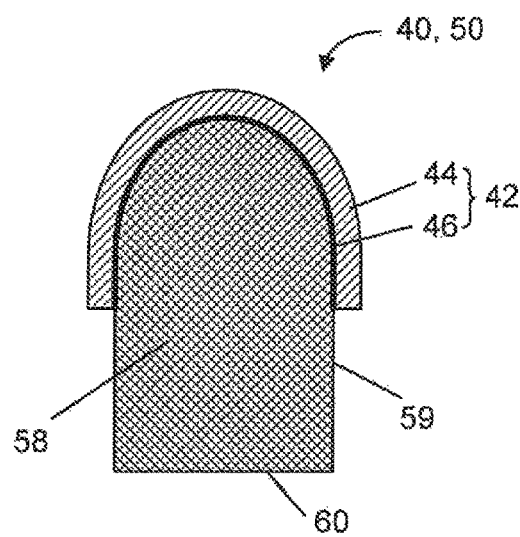
FIG. 3C illustrates a protrusion electrode having an electrode coating, according to another embodiment of the present invention.

As seen in FIG. 3 each of the first protrusion electrodes 40 and each of the second protrusion electrodes 50 have a protrusion body 60 and an electrode coating 42 provided thereon. The electrode coating 42 comprises an outer layer 44 and an adhesion-enhancement medium 46. As seen in FIG. 3A, the protrusion body 60 has a core 58 and a surface 59. The upper part of the core 58 is substantially round or arcuate, but it can also be in a different shape. The lower part of the core 58 can have straight wall, but can also be shaped differently as seen in FIGS. 3D-3I and 4. As seen in FIG. 3B, the adhesion-enhancement medium 46 is disposed on the core 58 of the protrusion body. In FIG. 3C, only part of the protrusion electrode 60 has an electrode coating 42. According to an embodiment of the present invention, the outer layer 44 can be made from a metal oxide, such as ITO, IZO, IGO, InO, ZTO, ZnO, ZnON, AlZTO and the like, wherein I or In is Iridium, T is Tin, Z or Zn is Zinc, G is Gallium, Al is Aluminum, N is Nitrogen and O is Oxygen. The outer layer 44 can be defined as a transparent conducting layer. The outer layer 44 can be used to receive voltage potential provided by the voltage source 28. The adhesion-enhancement medium 46 includes a metal such as aluminum (Al) and molybdenum (Mo), according to some embodiments of the present invention. In different embodiments of the present invention, the adhesion-enhancement medium 46 comprises a metal alloy containing Mo and at least one of the following elements: niobium (Nb), tantalum (Ta), titanium (Ti), zirconium (Zr), tungsten (W), Al and nitride (N). In other embodiments of the present invention, the adhesion-enhancement medium 46 comprises a metal alloy containing Al and at least one of the following elements: niobium (Nb), tantalum (Ta), titanium (Ti), zirconium (Zr), tungsten (W), Mo and nitride (N).

The adhesion-enhancement 46 can be defined as a non-transparent conducting layer.

The adhesion-enhancement medium 46 can be applied on the surface of the core 58 by sputtering, for example. Depending on the amount of metal sputtered onto the surface, the adhesion-enhancement medium 46 may or may not be a film or layer. The adhesion-enhancement medium 46 may include discrete patches sporadically distributed on the surface of the protrusion body 60. The adhesion-enhancement medium 46 may form a film having a thickness of 1 nm-50 nm. Specifically, the thickness of the film of the adhesion-enhancement medium 46 may between 0 nm-10 nm or even between 0 nm-5 nm. The weight percentage of the adhesion-enhancement medium 46 in the electrode coating 42 can be from 0.001 to 30 (0.001 wt % to 30 wt %). The height of the protrusion electrode can range from 0.5 um to 20 um, but it can be smaller or greater. According to various embodiments of the present invention, the outer layer 44 has a thickness ranged from 1 nm to 200 nm, but it can be thinner or thicker.

Figure 3D:
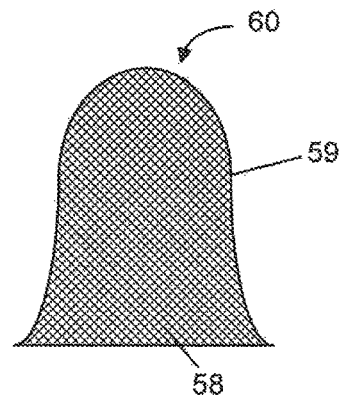
FIGS. 3D-3J illustrate the protrusion body of a protrusion electrode, according to other embodiments of the present invention.
Figure 3E:
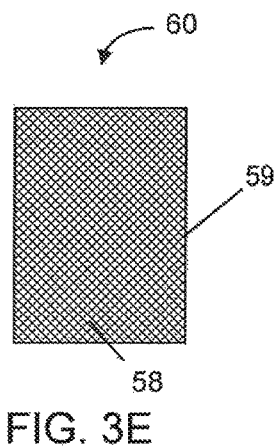
Figure 3F:
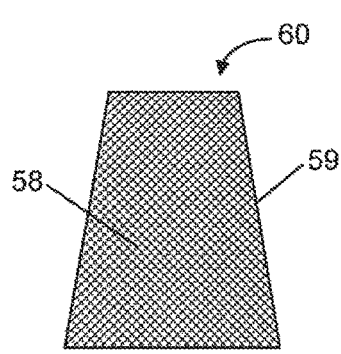
Figure 3G:
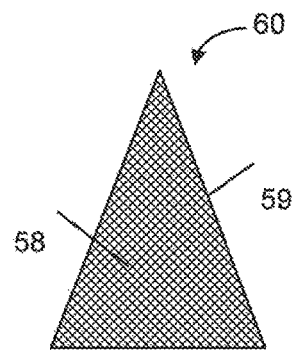

The electrode coating 42 can cover the entire surface of the protrusion body 60 as shown in FIG. 3, but can cover only the top part of the protrusion body 60 as shown in FIG. 3C. The protrusion body 60 can have substantially straight walls as shown in FIG. 3A, but it can be shaped differently. According to an embodiment of the present invention, the cross section of the protrusion body 60 can have a bell shape as shown in FIG. 3D. According to various embodiments of the present invention, the cross section of the protrusion body has a shape of a rectangle (FIG. 3E), a trapezoid (FIG. 3F), a triangle (FIG. 3G), a vase (FIG. 3H), a flask (FIG. 3I) or a dome (FIG. 3J). According to another embodiment of the present invention, the cross section of the protrusion body 60 can be shaped like a dumbbell as shown in FIG. 4. In the cross section as shown in FIGS. 3A and 3D to 4, the height can be greater than, equal to or smaller than the width.

Figure 4:
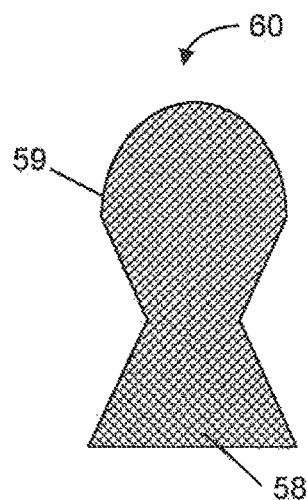
FIG. 4 illustrates the protrusion body of a protrusion electrode, according to yet another embodiment of the present invention.
Figure 4A:
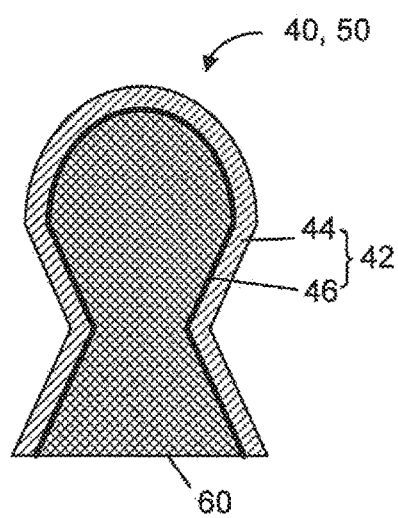
FIG. 4A illustrates an electrode coating disposed on the protrusion body of FIG. 4, according to an embodiment of the present invention.
Figure 4B:
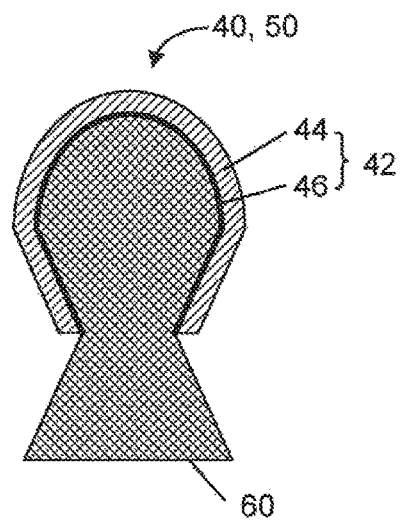
FIG. 4B illustrates an electrode coating disposed on the protrusion body of FIG. 4, according to another embodiment of the present invention.

As seen in FIGS. 4A and 4B, the electrode coating 42 can cover the entire surface of the protrusion body 60, but can cover only the top part of the protrusion body 60.

The dumbbell shaped cross section of the protrusion body 60 is further described in FIGS. 5 and 6. As seen in FIG. 5, the core 58 of the protrusion body 60 has a middle section defined by a waist (wst) 69 and a base defined a basewidth (bw) 65, wherein the waist is smaller than the basewidth. The waist is the short test distance between the opposing sides of the middle section, and the base is the flat side that is located adjacent to the upper surface of second substrate 20 of the display (see FIG. 1A). As seen in FIG. 6, the cross section 66 of the protrusion electrode 60 can be represented by two adjoining portions: a top portion 70 and a bottom portion 80. The top portion 70 includes an arcuate edge 72 and a flat edge 74. The arcuate edge 72 and the flat edge 74 are adjoined to each other at P1. The angle between the arcuate edge 72 and the flat edge 74 at P1 is denoted as the first angle 76. The bottom portion 80 has an upper edge 82, a lower edge 84 and two side edges 87 and 88. The shortest distance between the two side edges 87 and 88 defines the waist (wst) 69 of the protrusion body 60 and the length of the lower edge 84 defines the basewidth (bw) 65 of the protrusion body 60. The upper edge 82 and the side edge 87 are adjoined to each other at P2. The angle between the upper edge 82 and the side edge 87 is denoted as the second angle 86. According to an embodiment of the present invention, the sum of the first angle 76 and the second angle 86 has an angle range between 90 and 180 degrees.

Figure 3H:
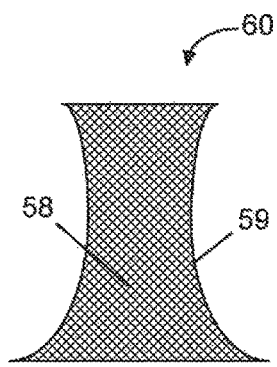
Figure 3I:
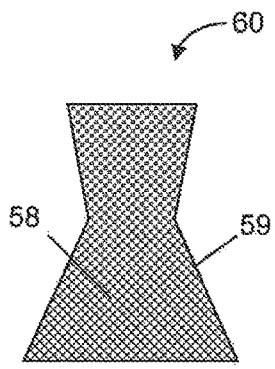
Figure 3J:
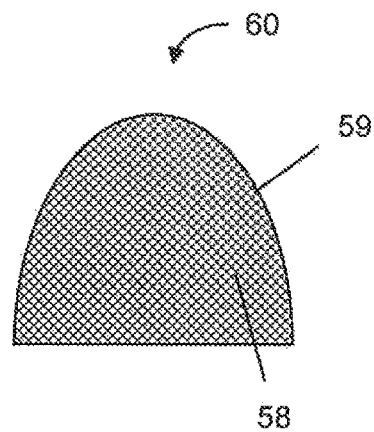

Likewise, the protrusion electrodes as shown in FIGS. 3H and 3I also have a waist smaller than the basewidth as shown in FIGS. 5A and 5B.

In summary, in an in-plane switching LCD panel wherein a plurality of protrusion electrodes are used to control the optical isotropicity of the liquid crystal layer, each of the protrusion comprising a protrusion body and an electrode layer disposed thereon, the adhesion of the electrode layer to the protrusion body can be enhanced by an adhesion-enhancement medium.

The electrode layer can be made from a metal oxide. The adhesion-enhancement medium comprises a metal such as aluminum and/or molybdenum, or a metal alloy containing Mo and at least one of the following elements: niobium (Nb), tantalum (Ta), titanium (Ti), zirconium (Zr), tungsten (W), Al and nitride (N). The metal alloy can also contain Al and at least one of the following elements: Nb, Ta, Ti, Zr, W, Mo and N. The core of the protrusion body can be made from a polymer, e.g. polyimide, epoxy or PMMA, for example.

According to various embodiments of the present invention, the thickness of the adhesion-enhancement layer can be 1-50 nm, but it can be smaller than 1 nm or greater than 50 nm, and the weight percentage of the adhesion-enhancement layer in the electrode coating can be from 0.001% to 30% and more specifically from 0.001% to 4% or 5%. It has been found that the thickness of the adhesion-enhancement medium has a relationship with the transmittance of the display. The transmittance is higher when the adhesion-enhancement medium is thinner. For example, as compared to a display wherein the protrusion electrodes do not have an adhesion-enhancement medium, the transmittance of a display having an adhesion-enhancement medium of about 1 nm thick on the protrusion electrodes is greater than 95%. The transmittance of a display having an adhesion-enhancement medium of about 50 nm thick is lower than 85%. The adhesion-enhancement layer may be a slightly sputtered film and hence with a significantly discontinuousness to increase roughness of the surface 59.

While the protrusion electrode can have various shapes, the protrusion electrode having a dumbbell shape has the advantage of lower driving voltage. The height of the protrusion electrode is in the range of 0.5 um-20 um, but it can be smaller or greater.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A liquid crystal display comprising:
    a first substrate;
    a second substrate;
    a liquid crystal layer disposed between the first substrate and the second substrate, a plurality of first protrusion electrodes and a plurality of second protrusion electrodes alternately arranged on the second substrate such that each of the plurality of first protrusion electrodes is adjacent to but spaced from at least one of the plurality of second protrusion electrodes, wherein each of the plurality of first protrusion electrodes and the plurality of second protrusion electrodes comprises a protrusion body with a surface, and an electrode coating disposed on the surface of the protrusion body, wherein the electrode coating comprises an outer electrode layer and an adhesion-enhancement medium disposed between the outer electrode layer and the surface, and
    a voltage source electrically coupled to the plurality of first protrusion electrodes and the plurality of second protrusion electrodes, the voltage source arranged to provide a voltage potential between a first protrusion electrode and an adjacent second protrusion electrode, such that
    the liquid crystal layer is configured in a first optical state when the voltage potential is provided between the first protrusion electrodes and the second protrusion electrodes, and
    the liquid crystal molecules are configured in a second optical state, when the first protrusion electrodes are electrically coupled to the second protrusion electrodes,
    wherein the outer electrode layer comprises a metal oxide layer, and the adhesion-enhancement medium comprises a metal or a metal alloy.

2. The liquid crystal display according to claim 1, wherein the metal oxide layer is made of a material selected from the group consisting of ITO, IZO, IGO, InO, ZTO, ZnO, ZnON and AlZTO.

3. The liquid crystal display according to claim 1, wherein the metal comprises aluminum or molybdenum.

4. The liquid crystal display according to claim 1, wherein the metal alloy consists of molybdenum and at least one of materials selected from the group consisting of niobium, tantalum, titanium, zirconium, tungsten, aluminum and nitride.

5. The liquid crystal display according to claim 1, wherein the metal alloy consists of aluminum and at least one of materials selected from the group consisting of niobium, tantalum, titanium, zirconium, tungsten, molybdenum and nitride.

6. The liquid crystal display according to claim 1, wherein the adhesion-enhancement medium has a thickness ranged from 1 nm to 50 nm.

7. The liquid crystal display according to claim 1, wherein the outer electrode layer has a thickness ranged from 1 nm to 200 nm.

8. A method of improving quality of a protrusion electrode in a display, the protrusion electrode comprising a protrusion body and an electrode layer disposed on the protrusion body, the method comprising:
    providing an adhesion-enhancement medium between the electrode layer and the protrusion body, wherein the electrode layer is made from an electrically conducting material and the adhesion-enhancement medium comprises a material different from said electrically conducting material, wherein the electrode layer comprises a metal oxide layer, and the adhesion-enhancement medium comprises a metal or a metal alloy.

9. The method according to claim 8, wherein the metal oxide layer is made of a material selected from the group consisting of ITO, IZO, IGO, InO, ZTO, ZnO, ZnON and AlZTO.

10. The method according to claim 8, wherein the metal comprises aluminum or molybdenum.

11. The method according to claim 8, wherein the metal alloy consists of molybdenum and at least one of materials selected from the group consisting of niobium, tantalum, titanium, zirconium, tungsten, aluminum and nitride.

12. The method according to claim 8, wherein the metal alloy consists of aluminum and at least one of materials selected from the group consisting of niobium, tantalum, titanium, zirconium, tungsten, molybdenum and nitride.

13. The method according to claim 8, wherein the adhesion-enhancement medium has a thickness ranged from 1 to 50 nm.

14. The method according to claim 8, wherein the electrode layer has a thickness ranged from 1 to 100 nm.

15. The method according to claim 8, wherein the display comprises a liquid crystal display.

16. The method according to claim 8, wherein the display comprises an in-plane switching display.

* * * * *